United States Patent
Keene (10) Patent No.: US 12,457,915 B2
(45) Date of Patent: Nov. 4, 2025

(54) AUTOMATIC STEERING DEVICE (71) Applicant: AGRICISION LIMITED, Maidenhead (GB)

(72) Inventor: Adam Keene, Maidenhead (GB)

(73) Assignee: AGRICISION LIMITED, Maidenhead (GB)

( * ) Notice: Subject to any disclaimer, the term of this patent is extended or adjusted under 35 U.S.C. 154(b) by 7 days.

(21) Appl. No.: 18/687,651

(22) PCT Filed: Sep. 2, 2022

(86) PCT No.: PCT/GB2022/052247
§ 371 (c)(1),
(2) Date: Feb. 28, 2024

(87) PCT Pub. No.: WO2023/031621
PCT Pub. Date: Mar. 9, 2023

(65) Prior Publication Data
US 2024/0389493 A1     Nov. 28, 2024

(30) Foreign Application Priority Data

Sep. 6, 2021  (GB) ....................... 2112623

(51) Int. Cl.
*A01B 69/00* (2006.01)
*A01B 69/04* (2006.01)
(52) U.S. Cl.
CPC .................. *A01B 69/008* (2013.01)
(58) Field of Classification Search
None
See application file for complete search history.

(56) References Cited

U.S. PATENT DOCUMENTS

| 7,648,004 B1 | 1/2010 | Larouche et al. |
| 2006/0011402 A1 | 1/2006 | Green et al. |

(Continued)

FOREIGN PATENT DOCUMENTS

| DE | 9314133 U1 | 11/1993 | |
| FR | 2686432 A1 * | 7/1993 | ............... B62D 1/00 |

(Continued)

OTHER PUBLICATIONS

Patent Acts 1977: Search Report under Section 17 for Application No. GB2112623.0, Jan. 6, 2022, 4 pages, United Kingdom Intellectual Property Office.

(Continued)

*Primary Examiner* — Shelley Chen
(74) *Attorney, Agent, or Firm* — Husch Blackwell LLP (57) ABSTRACT

An automatic steering device for a vehicle comprising: a frame: a handle coupled to the frame by a drive assembly: a motor; and a control module, and: wherein the handle is adapted to be held in a substantially stationary position by a user such that, in use, the drive assembly will rotate the steering wheel in accordance with a rotation command received from the control module. Also disclosed is an automatic steering system for steering a vehicle comprising: an automatic steering device: a location sensor: a guidance module which includes map data and which is adapted to define travel paths and to process location data from the location sensor by comparing the location data from the location sensor to the map data and the guidance module determines the steering instructions by comparing location data to the defined travel path: wherein the automatic steering device receives the steering instruction from the guidance module and moves the steering wheel in accordance with the steering instructions.

20 Claims, 7 Drawing Sheets (56) References Cited

U.S. PATENT DOCUMENTS

2016/0214643 A1   7/2016  Joughin
2017/0006759 A1   1/2017  Adamchuk et al.

FOREIGN PATENT DOCUMENTS

| JP | H081482 A | * | 1/1996 | |
|----|-----------|---|--------|---|
| JP | 2001121982 A | * | 5/2001 | |
| JP | 3842456 B2 | * | 11/2006 | |
| JP | 2008247289 A | * | 10/2008 | |
| JP | 2009090939 A | * | 4/2009 | |
| JP | 4759799 B2 | * | 8/2011 | |
| JP | 2018103915 A | * | 7/2018 | B62D 6/10 |
| JP | 2018103916 A | * | 7/2018 | B62K 21/06 |
| KR | 19990016638 A | * | 3/1999 | |
| WO | WO-2007105351 A1 | * | 9/2007 | B62D 5/0481 |

OTHER PUBLICATIONS

International Search Report and Written Opinion for International Application No. PCT/GB2022/052247, Mailed Feb. 15, 2023, 7 pages, European Patent Office.

International Preliminary Report on Patentability for International Application No. PCT/GB2022/052247, Mailed Mar. 5, 2024, 5 pages, The International Bureau of WIPO.

* cited by examiner

AUTOMATIC STEERING DEVICE

TECHNICAL FIELD

The present invention relates to automatic steering systems and automatic steering devices for vehicles. In particular, the present invention relates to automatic steering systems and automatic steering devices for agricultural vehicles such as tractors, harvesters and sprayers.

BACKGROUND

Most operations undertaken by agricultural vehicles require travelling along a pre-determined travel path, planned to maximise speed and efficiency of the operation. For example, a typical operation may be the spreading of fertilizer. In order to efficiently cover the desired area whilst not wasting fertiliser, the operation is often conducted along parallel lines, spaced to ensure no overlap of fertilizer application or uncovered area between applications.

When the travel path is manually planned and executed by the manual navigation of an agricultural vehicle, there is significant room for user error. For example, if the parallel lines are overlapped too much fertilizer will be applied which is not only wasteful but can have damaging effects on the environment.

In order to combat these issues, precision guidance systems and automatic steering devices can be used to plan the most efficient travel path and guide the user to adhere to the defined travel path or to automatically steer the vehicle to ensure the defined travel path is adhered to.

Some of these systems require the driver to observe certain indicators, for example LED lights, which prompt the driver to steer the vehicle back to the defined travel path in cases where it deviates. These systems can be useful as they are more cost-effective than the more advanced automatic steering devices. However, there is still a risk of user error with the use of these devices as they require the driver to constantly check the indicator and to steer the vehicle appropriately. In cases where drivers become distracted or over/under-steer the vehicle, these devices are not effective.

A more advanced solution involves automatic steering of the vehicle. These systems use a device fitted to or as a component part of the steering system of the vehicle. These devices can take over the steering of a vehicle, ensuring that the vehicle sticks to the predefined travel path. However, these systems are very costly and complicated to fit to a vehicle. The existing automatic steering systems require wiring into the vehicles electrical system and mechanically fixing to the steering column or another fixed component of the vehicle. These systems must be fixed onto the vehicle to function as the mechanical connection between the device and the vehicle acts as an anchor point, permitting the motor of the system to turn the steering wheel and/or steering column. As these systems must be mechanically and electrically connected to a vehicle, the systems are not suitable for moving between vehicles. For example, moving such a device would require disconnecting the electrical connection between the device and the vehicle and re-wiring the connection in a different vehicle. In addition, the systems often require specific adapters for fitting to specific vehicle models. As a result, the currently available automatic steering devices can be prohibitively complex and costly.

The present invention aims to obviate or mitigate some of the problems associated with the prior art automatic steering devices.

SUMMARY OF THE INVENTION

According to a first aspect of the present invention, there is provided an automatic steering device for a vehicle comprising:
  a frame with a steering wheel engaging means;
  a handle coupled to the frame by a drive assembly;
  a motor which is operably coupled to the drive assembly;
  a control module configured to receive a steering instruction and convert the steering instruction into a rotation command, and;
wherein the motor is mounted on or in the handle and the handle is adapted to be held in a substantially stationary position by a user such that, in use, the drive assembly will rotate the steering wheel in accordance with the rotation command received from the control module.

Preferably, the vehicle is an agricultural vehicle.

Advantageously, the device can be used to automatically steer an agricultural vehicle to optimise and increase the efficiency of a variety of agricultural operations, such as fertiliser spreading and pesticide spraying.

Advantageously, the user holding the handle in a substantially stationary position means that the user is providing reaction torque such that when the motor activates the drive assembly, the handle is held in place by the user allowing the frame and steering wheel to rotate about the drive assembly.

Preferably, the automatic steering device is portable.

Advantageously, the automatic steering device can be easily moved from one vehicle to another. In particular, the device does not need an electrical or fixed mechanical connection to the vehicle and therefore can be readily moved between vehicles without needing specialist skills or equipment.

Preferably, the frame is configured to extend substantially across the diameter of the steering wheel.

Advantageously, the extending capability of the frame enables the automatic steering device to be readily fitted to different steering wheels having different diameters.

Preferably, the steering wheel engaging means is configured such that the device is removable from the steering wheel.

Advantageously, when the steering wheel engaging means is configured such that the device is removable from the steering wheel, the device can be readily moved between vehicles. As a result, a single automatic steering device can be used across multiple vehicles resulting in a significant cost saving for the user.

Preferably, the device comprises at least two steering wheel engaging means, said at least two steering wheel engaging means being disposed on opposite sides of the frame.

Advantageously, the two steering wheel engaging means disposed opposite one another improve the grip of the device on the steering wheel resulting in more efficient and accurate movement of the steering wheel.

Preferably, the steering wheel engaging means comprises an adjustable clamping mechanism.

Advantageously, an adjustable clamping mechanism allows the device to be readily fitted to different steering wheels of different dimensions.

Preferably, the adjustable clamping mechanism comprises a ratchet system.

Advantageously, the ratchet mechanism allows for the secure tightening of the frame onto the steering wheel.

Optionally, the device includes a power source.

Preferably, the power source is a battery.

Advantageously, the inclusion of a power source, such as a battery, in the device increases the portability of the device and the ease by which it can be moved from one vehicle to another.

Preferably, the battery is located in the handle.

Optionally, the device comprises a sensor.

Advantageously, the sensor can be used to detect the angle between the frame and the handle. The sensor could be, for example, an optical or hall effect encoder.

Preferably, the control module comprises a data receiver.

Preferably, the data receiver is configured to receive wireless data.

Advantageously, the wireless data receiver allows data to be received from a remote device, such as a laptop, smartphone or tablet device without the need for a wired connection. This improves the portability of the device and the ease with which the device can be used with different external devices.

Preferably, the handle comprises a gripping portion.

Advantageously, the gripping portion provides a convenient means for the user to hold the handle in a substantially stationary position.

Optionally the gripping portion extends out substantially perpendicularly from the handle.

Preferably, the handle has a mass higher than that of the frame.

Advantageously, the handle being of a higher mass than the handle assists in providing a reaction force against which the drive assembly can affect the rotation of the frame as opposed to the handle.

Optionally, the handle comprises at least one button for operating at least one function of the automatic steering device.

Optionally, the at least one function of the at least one button is programmable from the guidance module.

Optionally, the at least one button is located on a thumb joystick on the handle.

Optionally, the at least one button operates at least one of the following functions: rotating the frame in a clockwise/anticlockwise direction; starting/stopping recording the coverage of the operation.

Preferably, the drive assembly comprises a bevel gear box.

Preferably, the motor powers the bevel gear box.

Preferably, the drive assembly is located substantially centrally within the frame.

Preferably, the handle is freely rotatable around the drive assembly.

Optionally, when no steering instructions are received, the handle remains in a substantially fixed position relative to the frame.

Advantageously, when the automatic steering is not in use, the handle can be used to move the automatic steering device and therefore, to move the steering wheel in a manual manner.

Preferably, the device allows for manual manipulation of the steering wheel.

Advantageously, a user can override the automatic steering of the device in response to an unforeseen obstacle or hazard providing a safety mechanism. Furthermore, the device does not need to be removed to allow for manual steering of the device.

Preferably, the handle comprises a control means for engaging and disengaging the automatic steering function.

Optionally, the means for engaging and disengaging the automatic steering function is an electrical means for engaging and disengaging the automatic steering function.

Advantageously, this allows the user to easily switch between manual and automatic steering functions. The electrical means may, for example, comprise stopping the supply of power to the motor. The means for engaging and disengaging may be a button or a switch and may be located on the handle.

According to a second aspect of the present invention, there is provided an automatic steering system for steering a vehicle comprising:
  an automatic steering device according to the first aspect of the invention;
  a location sensor configured to determine the geographical position of the vehicle;
  a guidance module which includes map data and which is adapted to define travel paths and to process location data from the location sensor by comparing the location data from the location sensor to the map data and the guidance module determines the steering instructions by comparing location data to the defined travel path;
wherein the automatic steering device receives the steering instruction from the guidance module and moves the steering wheel in accordance with the steering instructions.

Advantageously, the system allows for the automatic steering device to steer a vehicle to follow a pre-defined travel path. The pre-defined travel paths may, for example, be calculated to increase the efficiency of agricultural operations-such as optimising spread of fertiliser across a field. The automatic steering of the vehicle also reduces user error in following such pre-defined travel paths.

Preferably, the travel paths are associated with a cultivated field.

Preferably, the guidance module comprises a memory module.

Advantageously, the memory module can store maps and location data.

Preferably, the location sensor further determines the speed and direction of travel.

Preferably, the guidance module comprises a processor.

Preferably, the guidance module comprises a user interface.

Advantageously, the user interface allows for the user to specify parameters such as the desired operation (e.g. fertiliser spreading) and details of the vehicle. The user interface also provides a means of displaying the defined travel path to the user.

Optionally, the system further comprises an inertial measurement unit (IMU) device or means for detecting velocity and acceleration to compensate for the effects of body roll/lean.

Preferably, the location sensor is mountable on the outside of the vehicle and the guidance module comprises a receiver for receiving location data.

Often, a more robust location signal can be obtained on the outside of a vehicle. For example, the location sensor may be mounted onto the bonnet or roof of a vehicle.

Preferably, the location sensor is portable.

Advantageously, both the location sensor and automatic steering device being portable and easily attachable and detachable from a vehicle means that the system can be readily moved between vehicles. This is particularly advantageous as one system can be easily used across multiple vehicles reducing costs for the user.

Optionally, the location sensor is located on the automatic steering device.

Preferably, the steering instructions are transmitted from the guidance module to the automatic steering device via wireless technology. Most preferably, the steering instructions are transmitted from the guidance module to the automatic steering device via Bluetooth (RTM).

Preferably, the guidance module comprises software, preferably downloadable software, that can be run on a mobile phone or tablet device.

Optionally, the guidance module is integrated on the automatic steering device.

Various further features and aspects of the invention are defined in the claims.

Unless defined otherwise, all technical and scientific terms used herein have the meaning commonly understood by a person skilled in the art to which this invention belongs.

BRIEF DESCRIPTION OF THE DRAWINGS

Embodiments of the present invention will now be described by way of example only with reference to the accompanying drawings where like parts are provided with corresponding reference numerals and in which.

DETAILED DESCRIPTION

Figure 1:
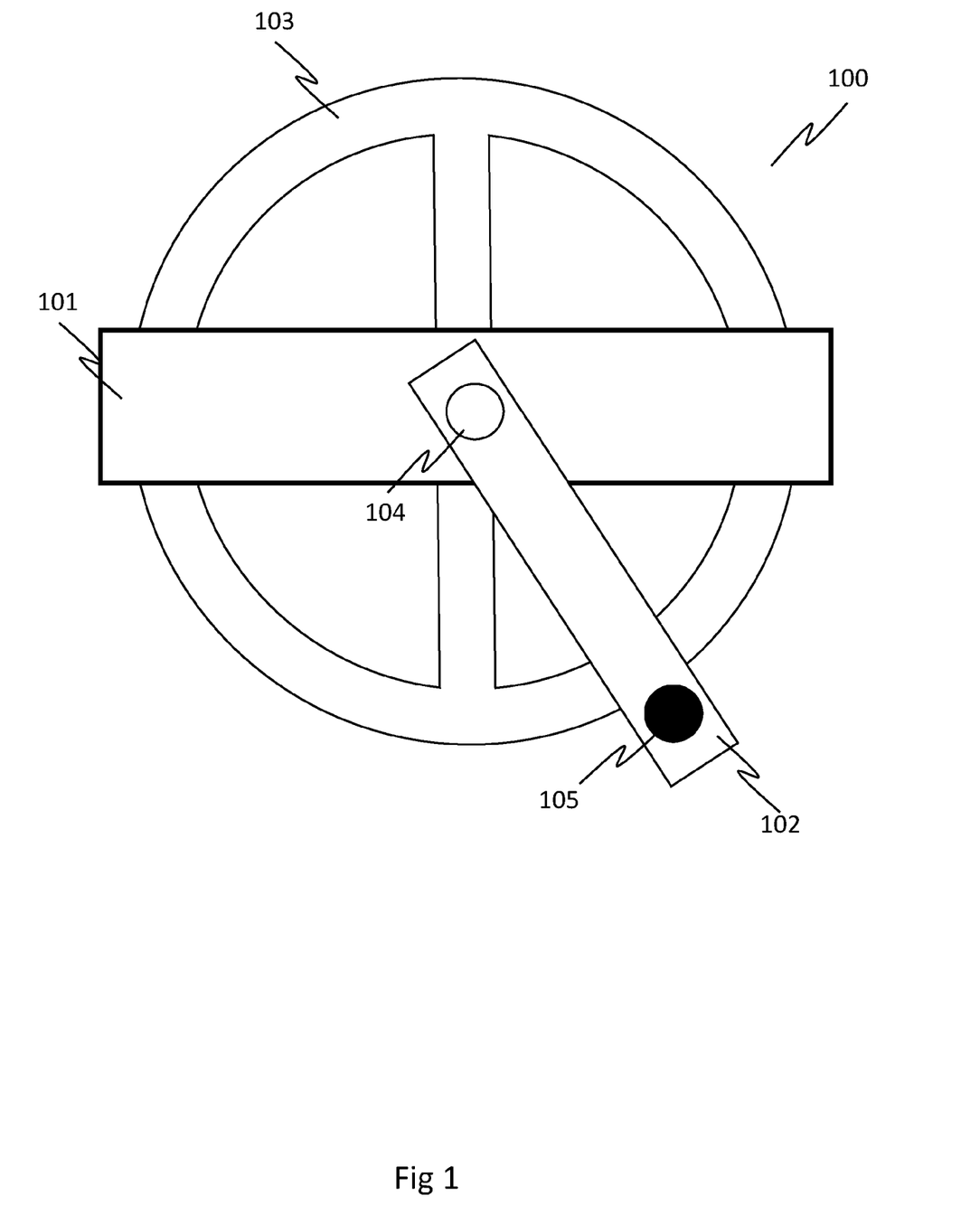
FIG. 1 is a simplified schematic diagram showing an above view of an automatic steering device fixed to a steering wheel.

FIG. 1 is a simplified schematic diagram of an automatic steering device 100 fitted to a conventional steering wheel 103 in accordance with certain aspects of the present invention. The automatic steering device 100 comprises an extruded aluminium frame 101 and a handle 102 with an aluminium chassis and a plastic housing. The automatic steering device 100 is fitted to the steering wheel 103 by the steering wheel engaging means (shown in FIG. 3) which are located on the frame 101.

The frame 101 is configured to extend across the diameter of the steering wheel 103. Located centrally on the frame 101 is a connection point 104. The connection point 104 is the point at which the handle 102 is operatively connected to the frame 101. The connection is configured to allow the handle 102 and frame 101 to rotate about one another.

Located at the connection point 104 and mounted within or on the handle 102 is a gear assembly which includes a gear such as a bevel gear. The connection between the frame 101 and the bevel gear can be made by any suitable fixing means such as screws, bolts or adhesive. The bevel gear is also connected to a motor, which in turn is connected to a battery. The battery may be an interchangeable and rechargeable battery that clips into the handle. The motor and battery are also located on or within the handle. In this embodiment, the larger bevel gear is bolted onto the frame whilst the smaller bevel gear is connected to the motor shaft of the handle mounted motor.

The handle 102 comprises a gripping portion 105. The gripping portion 105 is located towards the distal end of the handle 102, extending substantially perpendicularly from the plane of the handle, and provides a convenient means with which the user can hold the handle 102 in place. The gripping portion 105 may be any surface suitable for gripping such as a knob. The gripping portion 105 may be comprised of a high-friction material such as rubber to aid the user's grip and may be ergonomically shaped to be gripped comfortably by a user's hand. The gripping portion 105 may be freely rotatable on the handle 102 which allows a user to grip the knob without rotating their hand. The gripping portion 105 may be fixed to the handle 102 by any suitable means such as adhesive or screws. Alternatively, the gripping portion may be provided by the outer casing of the handle. For example, the gripping portion may be provided by the rubberising of the outer casing of the handle.

Figure 2:
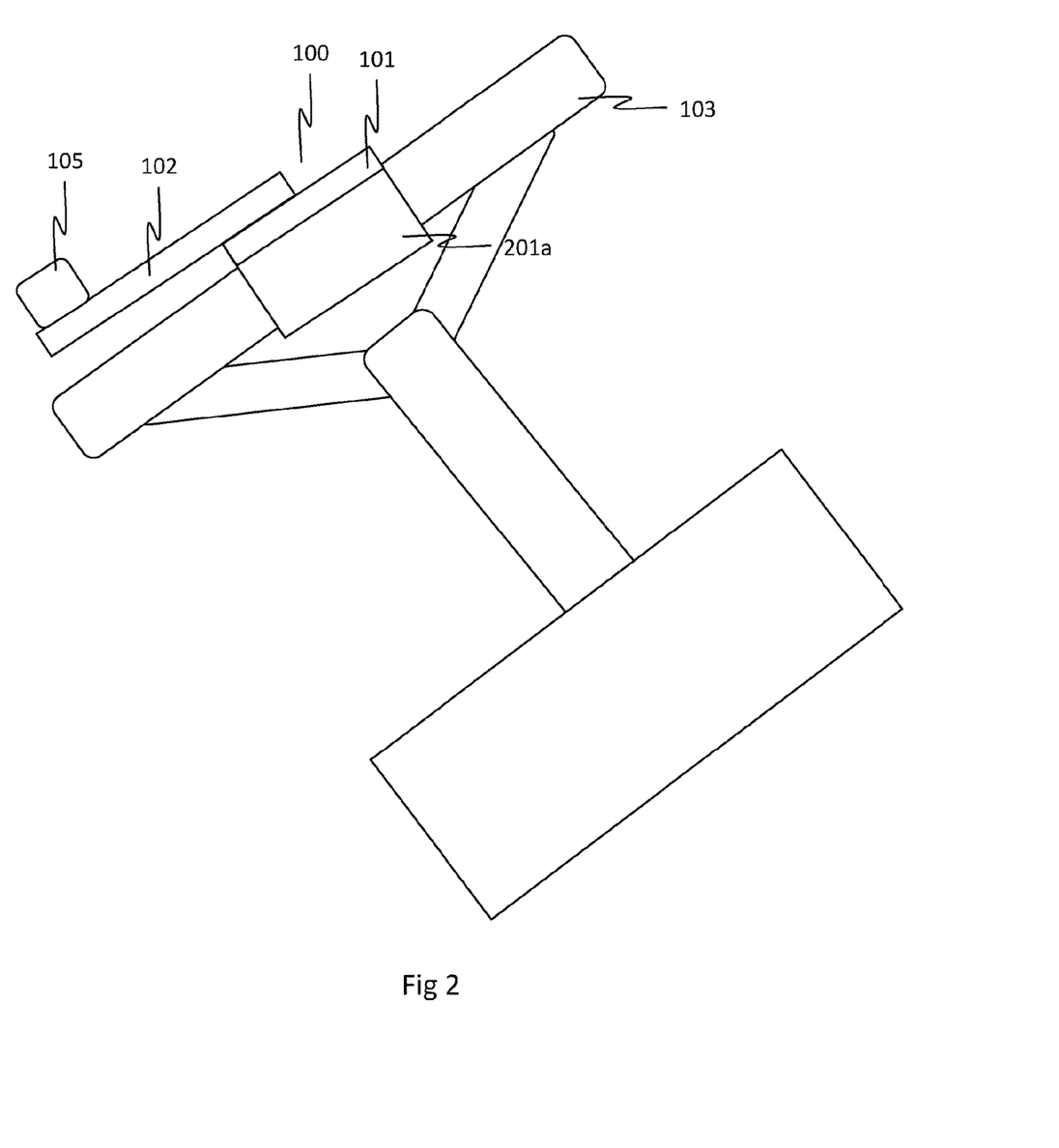
FIG. 2 is a simplified schematic diagram showing a side view of an automatic steering device fixed to a steering wheel.

FIG. 2 shows a side view of the automatic steering device 100 connected to a steering wheel 103. Underneath the frame 101 on a first end of the frame 101 is a first steering wheel engaging means 201a. A second steering wheel engaging means 201b (not shown) is located on a second end of the frame 101, opposite to the first side. The steering wheel engaging means 201 is configured to fit around the outside edge of the steering wheel 103 and grip the steering wheel 103. The steering wheel engaging means 201 may be rubberised to increase the friction between the steering wheel engaging means 201 and the steering wheel 103 and provide a more secure connection. Together, the first steering wheel engaging means 201a and second steering wheel engaging means 201b clamp the automatic steering device 100 in place on the steering wheel 103.

Figure 3:
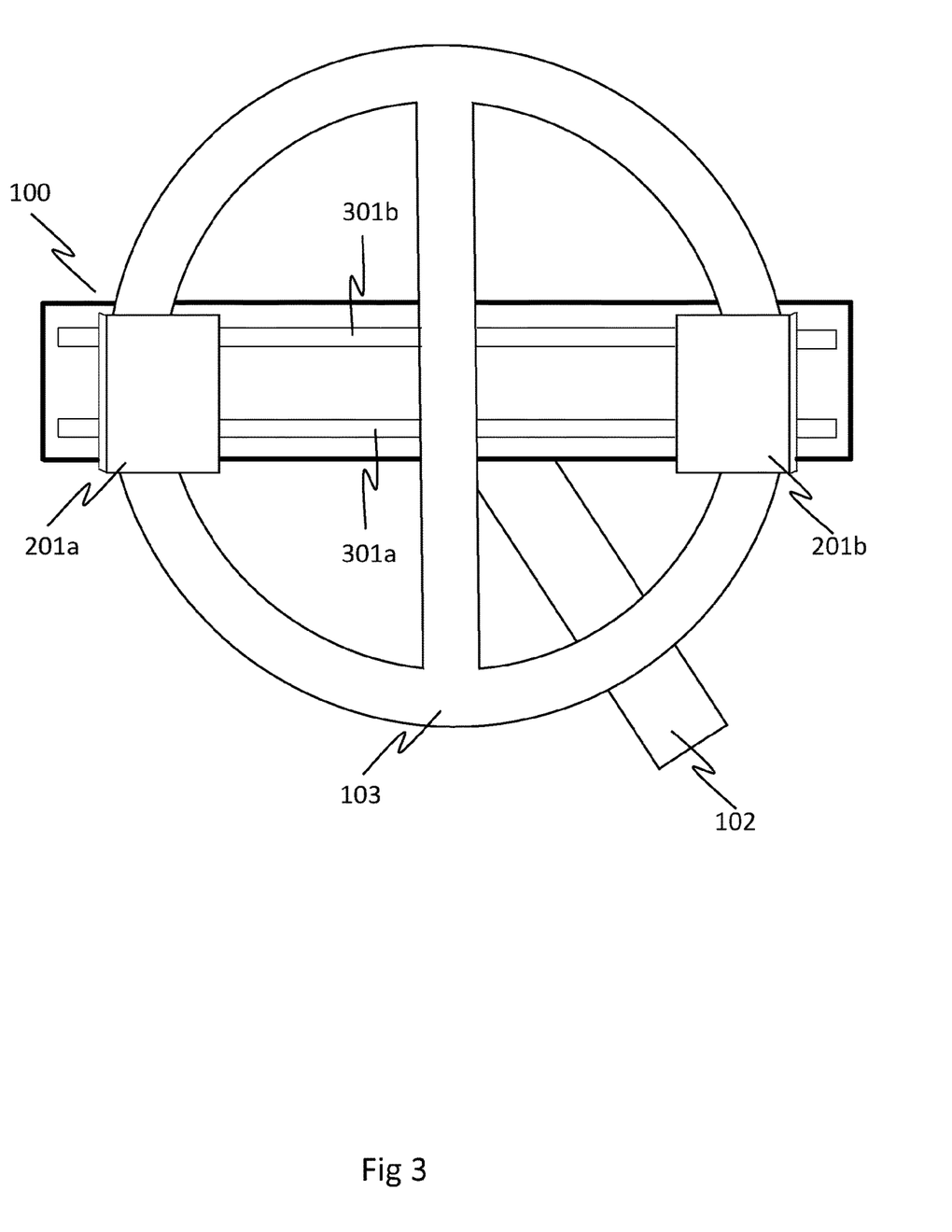
FIG. 3 is a simplified schematic diagram showing a below view of an automatic steering device fixed to a steering wheel.

FIG. 3 shows a view of the automatic steering device 100 in place on the steering wheel 103 from underneath the steering wheel 103. The first steering wheel engaging means 201a and second steering wheel engaging means 201b are located on opposite ends of the frame 101. The steering wheel engaging means 201 are configured to extend around the outer edge of the steering wheel 103 and across at least a portion of the underside of the steering wheel 103.

The diameter of the frame 101 may be extendible to allow the device to be fitted onto a range of steering wheels of different circumference. In one embodiment the frame is telescopic and can be fixed at a range of lengths, for example using a ratchet mechanism. As shown in FIG. 3, on the underside surface of the frame 101, there are two rods 301. The two rods 301 have a substantially circular cross-section and are comprised of metal, such as aluminium. The first steering wheel engaging means 201a and second steering wheel engaging means 201b are each operably connected to both the first rod 301a and second rod 301b and can be tensioned by a ratchet and pinion mechanism (not shown). The rachet mechanism ensures that the first steering wheel engaging means 201a and second steering wheel engaging means 201b can be securely held at a specific point on the two rods 301 to allow for a secure fit of the automatic steering device 100 on the steering wheel 103 and easy securing and removal of the device.

When in use, the automatic steering device 100 is held in place on a steering wheel 103 such that the frame 101 extends across the diameter of the steering wheel 103 and is secured thereto, and the connection point 104 (not shown) is located substantially centrally on the steering wheel 103. When positioning the automatic steering device 100, the distance between the two steering wheel engaging means 201 is larger than the diameter of the steering wheel such that the steering wheel 103 is locatable between the steering wheel engaging means 201. The user can then bring the two steering wheel engaging means 201 closer together until the steering wheel engaging means 201 each come into contact with an outer surface of the steering wheel 103. As a result, the steering wheel 103 is clamped within the steering wheel engaging means 201, fixing the automatic steering device 100 to the steering wheel 103. Advantageously, this configuration allows the automatic steering device 100 to be easily fitted to steering wheels of different vehicles having different dimensions.

In an alternative embodiment, the steering wheel engaging means 201 may be configured to grip onto the inner edge of the steering wheel 103. In this embodiment, when fitting the automatic steering device 100, the steering wheel engaging means 201 are positioned such that the distance between the steering wheel engaging means 201 is smaller than the diameter of the steering wheel 103. In this embodiment, in order to fit the automatic steering device 100 the user increases the distance between the steering wheel engaging means 201 until the steering wheel engaging means 201 come into contact with the inner surface of the steering wheel. In this embodiment, the automatic steering device 100 is held under tension in place on the steering wheel 103.

The rachet mechanism, which fixes the steering wheel engaging means 201 to the two rods 301, ensures that the steering wheel engaging means 201 do not slide away from the outer edge of the steering wheel 103, therefore loosening the fit of the automatic steering device 100 on the steering wheel 103.

Figure 4:
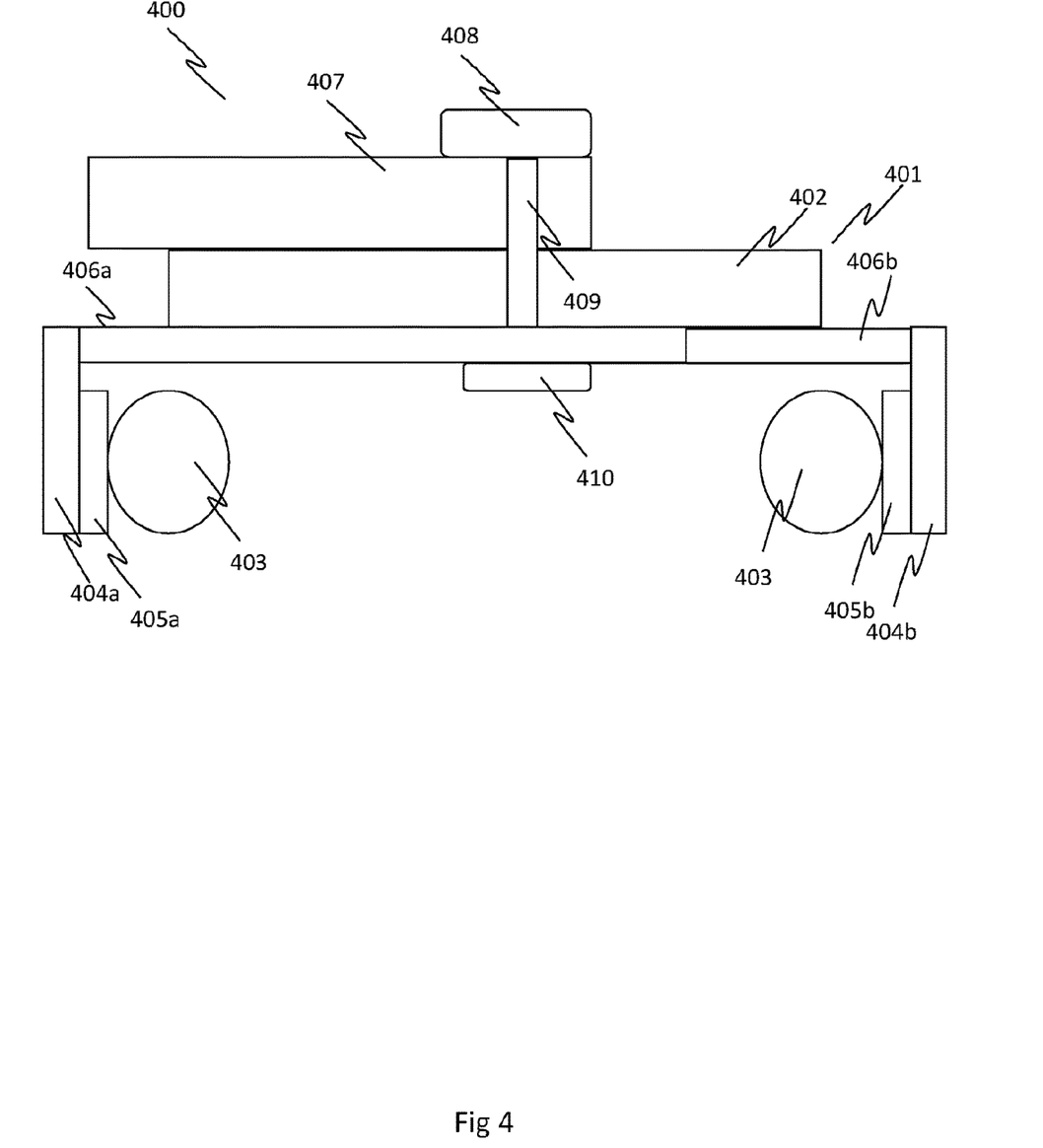
FIG. 4 is a flow diagram of the guidance module and location sensor in combination with a simplified schematic diagram showing the automatic steering device.

FIG. 4 shows an alternative embodiment of an automatic steering device. FIG. 4 shows a cross section of an automatic steering device 400 fitted to a steering wheel 403. The diameter of the frame 401 may be extended or retracted to fit to a particular steering wheel. The frame 401 comprises an aluminium extrusion 402 having channels (not shown) allowing for two aluminium sliding plates 406a, 406b to provide the extending/retracting function of the frame 401.

To extend or retract the sliding plates 406a, 406b, the tensioning knob 408 must be released by pulling it upwards, in a direction away from the handle 407. When the tensioning knob is released, it is free to rotate on the extension/retraction of the sliding plates 406a, 406b. Once the tensioning knob 408 is released, the steering wheel engaging means 404a, 404b can be manually pulled apart to extend the sliding plates 406a, 406b out of the aluminium extrusion 402, or pushed together to retract the sliding plates 406a, 406b into the aluminium extrusion 402. The sliding plates 406a, 406b engage with a pinion 410 which rotates on the extension/retraction of the sliding plates 406a, 406b. The pinion 410 is connected to a shaft 409, which runs through the frame and handle and is connected to the tensioning knob 408. The rotation of the pinion 410 resulting from the extension/retraction of the sliding plates 406a, 406b results in the rotation of the shaft 409, which in turn rotates the tensioning knob 408.

Located underneath the tensioning knob 408 is a dog clutch (not shown). When the tensioning knob 408 is pushed back towards the handle 407, it engages with the dog clutch. The engagement between the dog clutch and tensioning knob 408 prevents the rotation of the tensioning knob 408 which in turn prevents the rotation of the shaft 409 and the pinion 410, preventing the sliding plates 406a, 406b from being extended or retracted. As a result, when the tensioning knob 408 is engaged with the dog clutch, the frame 401 cannot be extended, therefore ensuring a secure fit on the steering wheel 403.

One end of each of the sliding plates 406a, 406b comprise steering wheel engaging means 404a, 404b. The steering wheel engaging means 404a, 404b hold gripping pads 405a, 405b to grip to the steering wheel 403. The gripping pads 405a, 405b are manufactured from a high friction material, such as rubber. The handle 407 comprises an aluminium chassis, onto which the motor is fixed. The aluminium chassis and the motor fixed thereto are enclosed in a plastic outer casing.

Figure 5:
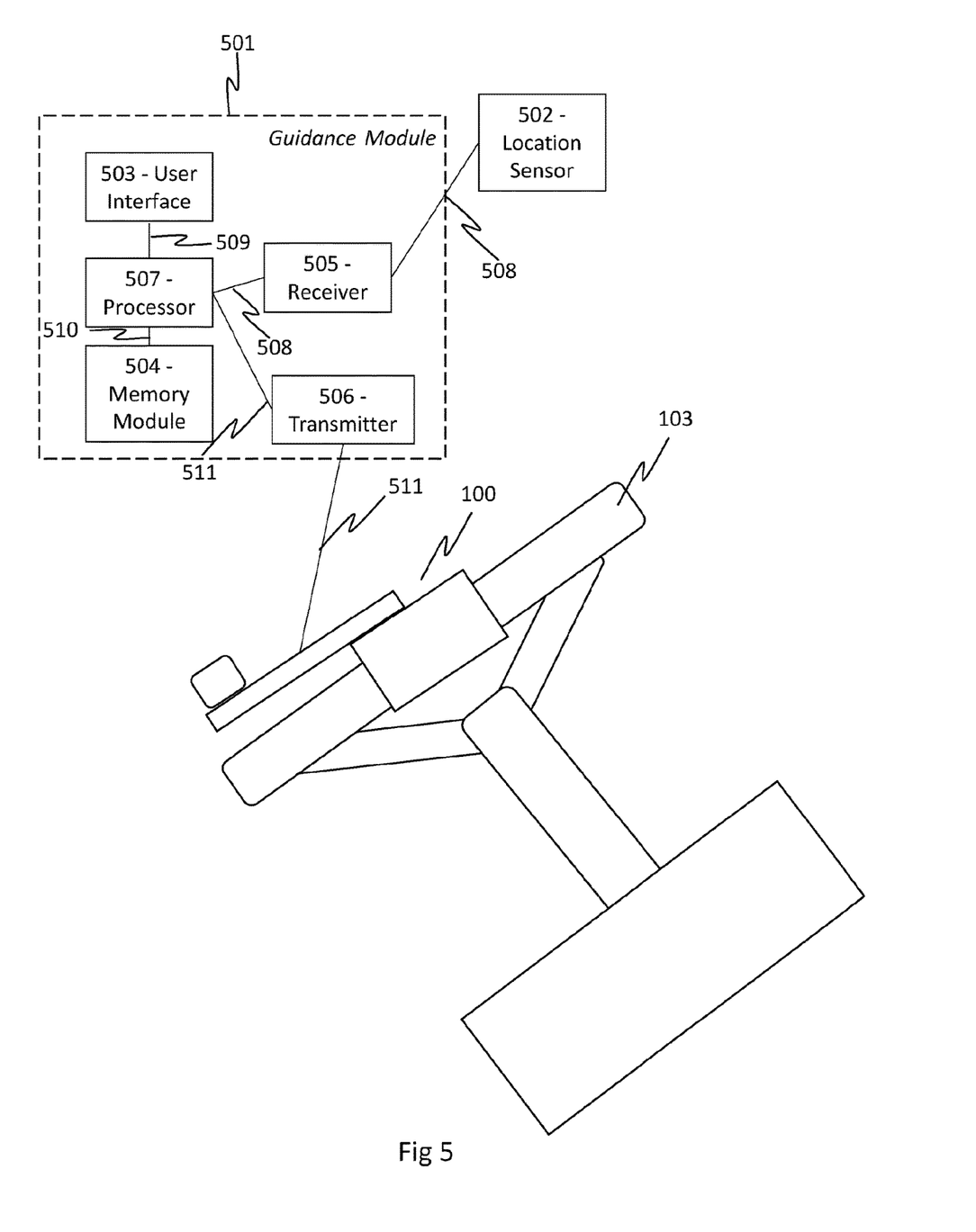
FIG. 5 is a flow diagram showing the automatic steering system.

FIG. 5 shows an automatic steering device 100 and a flow chart depicting the automatic steering device 100 in connection with a guidance module 501 and location sensor 502. The location sensor 502 is a device suitable for mounting on the outside of the vehicle, such as the roof or bonnet. The location sensor may use GPS. Alternatively, laser or optical positioning may be used. The location sensor 502 may be contained within a casing comprising a fixing means. The fixing means can be any fixing means suitable for fixing the location sensor 502 to a vehicle. Preferably, the fixing means is a detachable fixing means, such as a magnet configured to connect with the outside of a metal vehicle.

The guidance module 501 comprises downloadable software and is present on a tablet device, smartphone, laptop or any other suitable device. The guidance module 501 comprises a user interface 503 suitable for displaying data and collecting user data 509. The guidance module 501 also comprises a memory module 504 suitable for storing data such as map data. The guidance module 501 also comprises a receiver 505 suitable for receiving wireless data such as location data 408, and a transmitter 506 suitable for wirelessly transmitting data, such as steering data. The guidance module 501 also comprises a processor 507 for processing data.

When in use, the location sensor 502 transmits location data 508 to the guidance module 501 providing the location of the vehicle on which the location sensor 502 is mounted. The location data 508 is received by the receiver 505 on the guidance module 501 and transmitted to the processor 507. The user can input user data 509 at the user interface 503, such as the desired operation and spread of the vehicle. User data 509 is transmitted to the processor 507. Map data 510 is stored on the memory module 504 and transmitted to the processor 507. The processor 507 uses the user data 509, location data 508 and map data 510 to compute a steering instruction 511. The steering instruction is transmitted from the processor 507 to the transmitter 506. The transmitter 506 wirelessly transmits the steering instruction 511 to the automatic steering device 100, which effects the steering instruction 511 thereby rotating the steering wheel 103.

Figure 6:
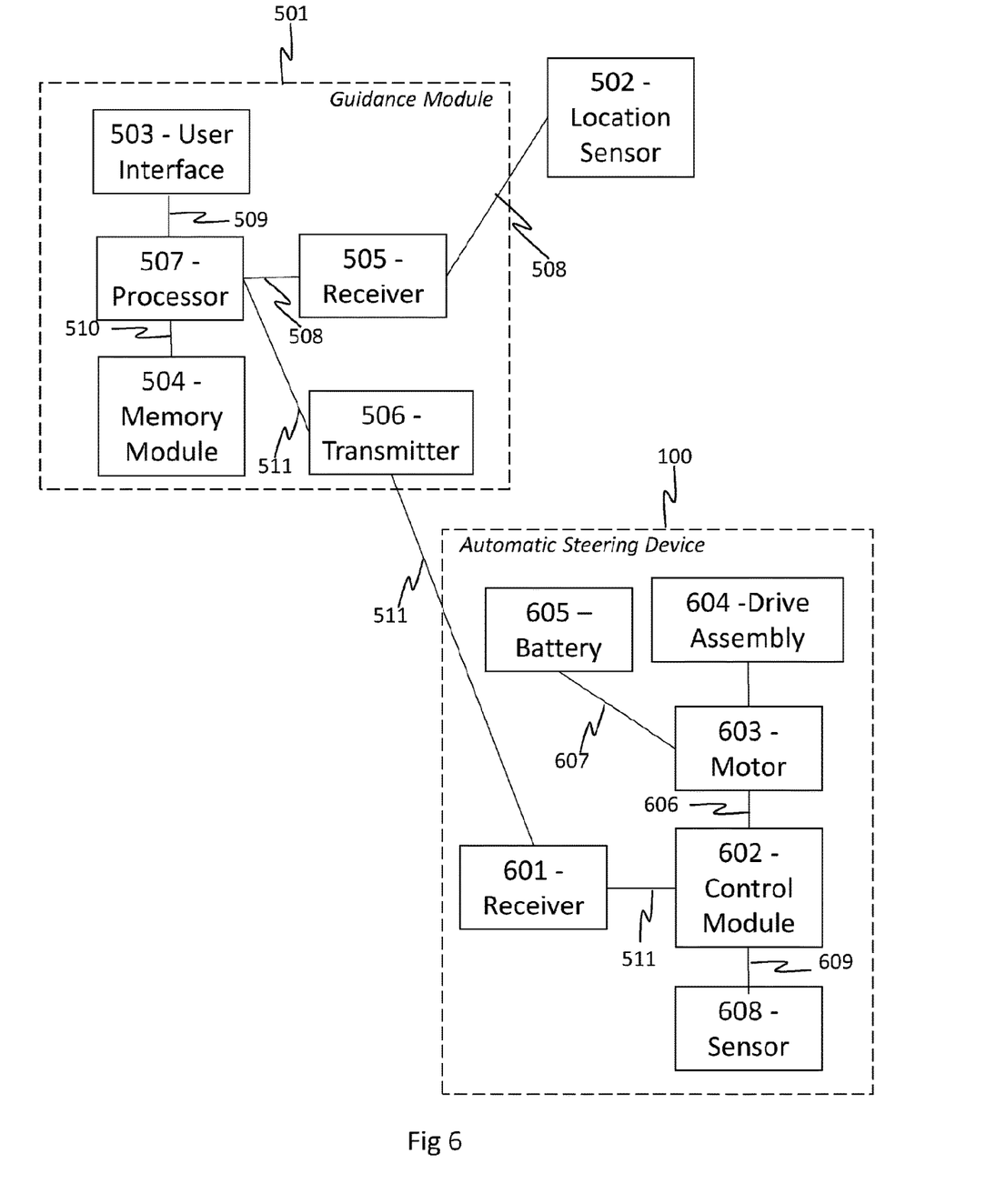
FIG. 6 is a simplified schematic diagram of the drive assembly.

FIG. 6 shows a system diagram of the automatic steering system. The automatic steering device 100 comprises a receiver 601 for receiving wireless data and a control module 602 for processing the data. A battery 605 provides power to a motor 603 which rotates a drive assembly 604. The drive assembly 604 effects the rotation of the automatic steering device 100 and thereby the rotation of the steering wheel 103. The drive assembly 604 comprises a bevel gear. The drive assembly 604 is described in further detail below with reference to FIG. 7. In preferred embodiments, the automatic steering device 100 also comprises a slip ring to enable electronic transmission between the frame 101 and steering wheel 103. For example, to allow a sensor located in the frame 101 to be powered by the battery 605 located in the handle 102.

In use, the device is secured to the steering wheel 103 of a vehicle and a steering instruction 511 is generated by the guidance module 501 as described with reference to FIG. 5.

The steering instruction 511 is received by the receiver 601 and transmitted to the control module 602. The control module 602 converts the steering instruction 511 into a rotation command 606. The rotation command 606 is transmitted to the motor 603 which rotates the drive assembly 604 in accordance with the rotation command 606. The rotation command 606 instructs the motor 603 to rotate in either a clockwise or anti-clockwise direction. The sensor 608 determines the degree of rotation applied to the steering wheel. The sensor 608 transmits rotation feedback 609 to the control module 602. The sensor 608 could be a hall effect sensor or an optical sensor. Alternatively, the frame may include an inertial measurement unit (IMU) which may act as a sensor to determine the rotation of the steering wheel. The control module 602 determines whether the desired degree of rotation has been reached. Once the desired degree of rotation has been reached, the control module 602 stops the motor 603. The battery 605 supplies power 607 to the motor 603. When the handle of the automatic steering device 100 is held in place by a user, the user provides a reaction force such that the rotation of the drive assembly 604 effects the rotation of the automatic steering device 100 and thereby, the rotation of the steering wheel 103.

Figure 7:
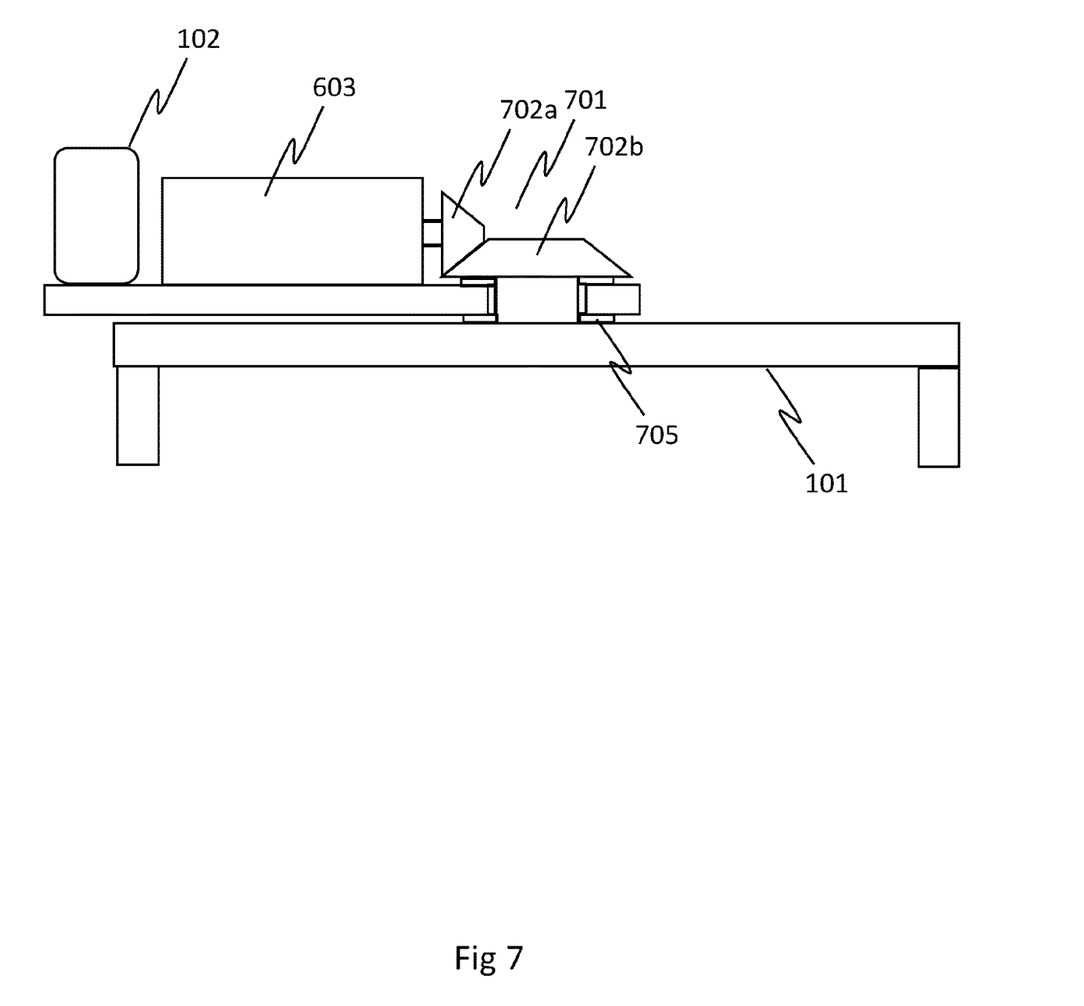
FIG. 7 is a simplified schematic diagram showing a side view of a drive assembly.

FIG. 7 is a simplified schematic diagram of a drive assembly according to certain aspects of the present invention. The drive assembly 604 comprises a bevel gear 701. The bevel gear comprises two complementary gear heads, a first gear head 702a connected to the motor 603 and a second gear head 702b connected to the frame 101. Located within the space between the second gear head 702b and frame 101 are a plurality of bearings.

Each of the pair of gear heads 702a, 702b comprise a series of equally spaced teeth and grooves (not shown) around the outer circumference of the gear head. The equally spaced teeth and grooves of the gear heads 702a, 702b are configured such that the teeth of the first gear head 702a fit into the grooves of the second gear head 702b and vice versa.

When in use, the handle 102 comprising the motor 603 is held in a substantially stationary position by the user. The motor 603 is configured to rotate the first gear head 702a in a clockwise or anticlockwise direction by the number of degrees as specified by the rotation command. As the first gear head 702a rotates, for example in a clockwise direction, the teeth 7 of the first gear head 702a move from one groove in the second gear head 702b to another groove thereby resulting in the anti-clockwise rotation of the second gear head 702b.

When handle 102 is held in a substantially stationary position and the second gear head 702b rotates as a result of the rotation of the first gear head 702a, the frame 101 also rotates as a result of the fixed connection between second gear head 702b and the frame 101. The bearings 7 between the second gear head 702b and frame 101 assist in reducing friction between the frame and the handle and results in a smooth rotation of the frame 101 about the handle 102.

In use, the user positions the location sensor 502 on an outer surface of the vehicle, such as by magnetic attachment to the roof or bonnet of a tractor. The user then enters the tractor and fits the automatic steering device 100 to the steering wheel 103 by bringing the steering wheel engaging means into contact with the steering wheel 103, as described above with reference to FIG. 3 or 4.

The user may input data into the guidance module 501 via a user interface. The user data 509 may include information such as the type of operation (e.g. fertiliser spraying), implement width, the diameter of the spread and the desired overlap of the spread. The processor 507 uses a combination of location data 508 from the location sensor 502, user data 509 inputted by the user and map data 510 stored in the memory module 504 to determine the appropriate steering instructions 511.

The steering instructions 511 are communicated by the transmitter 506 on the guidance module 501 to the receiver 601 on the automatic steering device 100. The steering instruction 511 is converted to a rotation command 606 by the control module 602. The motor 603 then rotates the drive assembly 604 in accordance with the rotation command 606.

When the user is holding the gripping portion 105 of the handle 102 in a substantially stationary position, the rotation of the drive assembly 604 results in the rotation of the frame 101 and steering wheel 103. When the user operates the tractor (e.g. starts the engine and removes the brake) whilst holding the gripping portion 105 in place, the tractor is steered automatically in accordance with the steering instruction 511 computed by the guidance module 501. If whilst the tractor is being automatically steered the user sees an unforeseen obstacle, for example a tree stump, the user can manually override the automatic steering by rotating the steering wheel manually. Alternatively, there may be a means to disengage the automatic steering, such as a button or switch which prevents power being supplied to the motor 603. When the power on the automatic steering device is disengaged, the handle is not free to rotate about the frame and therefore the rotation of the handle by the user will result in a corresponding rotation of the frame and steering wheel. The automatic steering of the vehicle can be manually overridden by the user at any point during operation of automatic steering system.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" or "comprising" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

The invention claimed is:

1. An automatic steering device for a vehicle with a steering wheel, the automatic steering device comprising:
   a frame with a steering wheel engaging means;
   a handle coupled to the frame by a drive assembly;
   a motor which is operably coupled to the drive assembly;
   a control module configured to receive a steering instruction and convert the steering instruction into a rotation command; and
   wherein the motor is mounted on or in the handle, and wherein the handle is adapted to be held in a substantially stationary position by a user such that, in use, the drive assembly will rotate the steering wheel in accordance with the rotation command received from the control module.

2. An automatic steering device according to claim 1, wherein the frame is configured to extend substantially across the diameter of the steering wheel.

3. An automatic steering device according to claim 1, wherein the steering wheel engaging means is configured such that the device is removable from the steering wheel.

4. An automatic steering device according to claim 1, wherein the device comprises at least two steering wheel engaging means, the at least two steering wheel engaging means being disposed on opposite sides of the frame.

5. An automatic steering device according to claim 1, wherein the steering wheel engaging means comprises an adjustable clamping mechanism.

6. An automatic steering device according to claim 5, wherein the adjustable clamping mechanism comprises a ratchet system.

7. An automatic steering device according to claim 1, wherein the device includes a power source.

8. An automatic steering device according to claim 1, wherein the control module comprises a data receiver.

9. An automatic steering device according to claim 1, wherein the handle comprises a gripping portion.

10. An automatic steering device according to claim 1, wherein the handle has a mass higher than a mass of the frame.

11. An automatic steering device according to claim 1, wherein the drive assembly comprises a bevel gear box.

12. An automatic steering device according to claim 1, wherein the drive assembly is fixed substantially to the center of the frame.

13. An automatic steering device according to claim 1, wherein the handle is freely rotatable around the drive assembly.

14. An automatic steering device according to claim 1, wherein the device is configured to allow for manual manipulation of the steering wheel when the device is engaged with the steering wheel.

15. An automatic steering device according to claim 1, wherein the handle comprises a control means for engaging and disengaging the automatic steering device.

16. An automatic steering system for steering a vehicle with a steering wheel, the automatic steering system comprising:
   an automatic steering device according to claim 1;
   a location sensor configured to determine the geographical position of the vehicle; and
   a guidance module that includes map data, wherein the guidance module is configured to define a travel path and to process location data from the location sensor by comparing the location data from the location sensor to the map data, and wherein the guidance module determines one or more steering instructions by comparing location data from the location sensor to the travel path defined by the guidance module;
   wherein the automatic steering device receives the one or more steering instructions from the guidance module and moves the steering wheel in accordance with the one or more steering instructions.

17. An automatic steering system according to claim 16, wherein the guidance module comprises a user interface.

18. An automatic steering system according to claim 16, wherein the system further comprises an inertial measurement unit (IMU) device or means for detecting velocity and acceleration to compensate for the effects of at least one of body roll and lean.

19. An automatic steering system according to claim 16, wherein the location sensor is mountable on the outside of the vehicle and the guidance module comprises a receiver for receiving the location data from the location sensor.

20. An automatic steering system according to claim 16, wherein the location sensor is located on the automatic steering device.

* * * * *